United States Patent [19]
Nakamura

[11] Patent Number: 6,047,737
[45] Date of Patent: Apr. 11, 2000

[54] FILTER FIXTURE

[76] Inventor: Koji Nakamura, 5-1-13 Minami-Karasuyama, Setagaya-ku, Tokyo 157, Japan

[21] Appl. No.: 09/183,719

[22] Filed: Oct. 30, 1998

[51] Int. Cl.⁷ ........................................................ F15D 1/02
[52] U.S. Cl. .................................. 138/41; 138/44; 138/45
[58] Field of Search .................................. 138/41, 40, 44, 138/45

[56] References Cited

U.S. PATENT DOCUMENTS

| | | | |
|---|---|---|---|
| 2,393,423 | 1/1946 | Sekera | 138/41 |
| 2,457,578 | 12/1948 | Maliphant | 138/41 |
| 3,109,459 | 11/1963 | Lee, II et al. | 138/41 |
| 5,511,585 | 4/1996 | Lee, II | 138/44 |

FOREIGN PATENT DOCUMENTS 236300  8/1990  Japan .
2516528  7/1996  Japan .

Primary Examiner—Patrick Brinson
Attorney, Agent, or Firm—Trexler, Bushnell, Giangiorgi & Blackstone, Ltd.

[57] ABSTRACT

An improved method and device for attaching a filter to the entrance of a pipe has been described. The filter attaching device includes an upper portion and a lower portion. The upper portion includes a plurality of projections for securing the filter to the device. The lower portion is connected to the upper portion and retains the filter in engagement with the entrance to the pipe. The lower portion is inserted into the pipe so that the filter is brought into contact with the entrance to the pipe. The lower portion includes means for frictionally engaging the walls of the pipe so that the device and filter are retained in a fixed position.

17 Claims, 3 Drawing Sheets

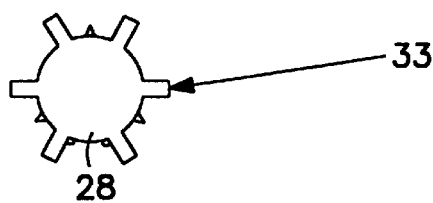
FIG. 1
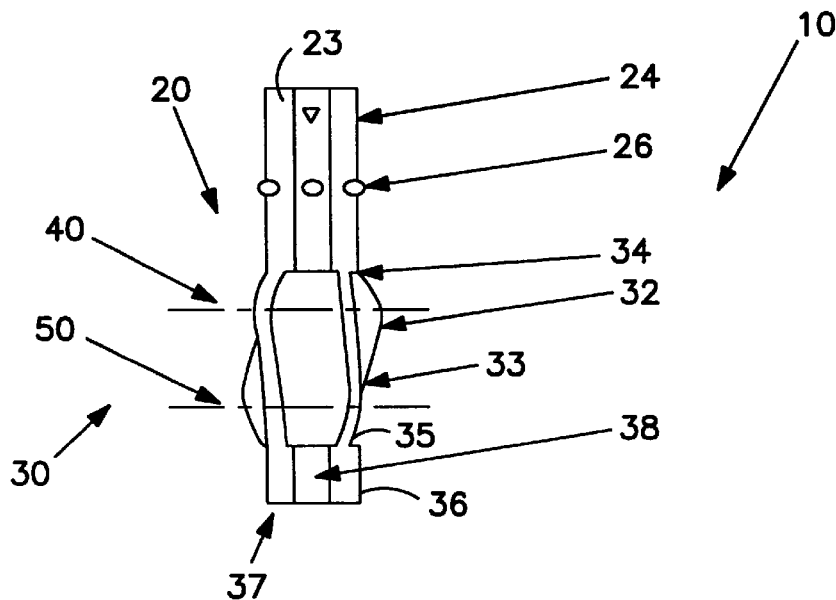
FIG. 2
FIG. 3
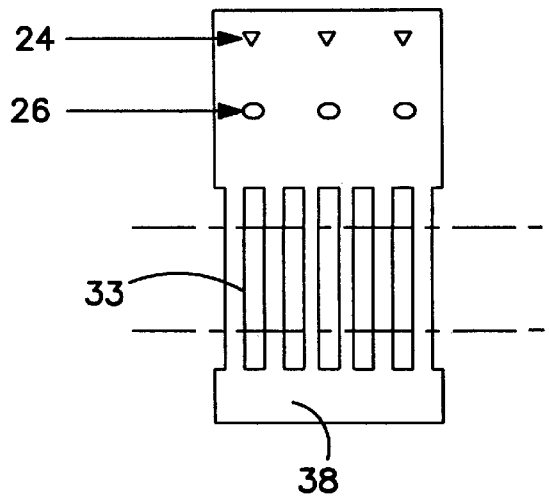
FIG. 4
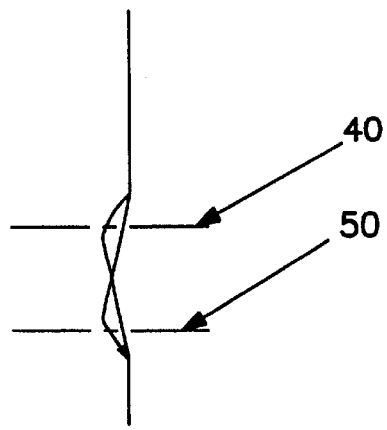

6,047,737

FILTER FIXTURE

FIELD OF THE INVENTION

This invention relates to filters used, for example, in water tanks and oil tanks to remove impurities and, in particular to means for attaching such filters to the tanks.

BACKGROUND OF THE INVENTION

The use of filters to remove impurities from fluid streams is well known. A filter is placed in the flow path of the fluid stream to collect the impurities that are present in the stream. For example, the filter may be placed in front of an inlet pipe to a fluid storage tank. The filter is made of material which will allow passage of the fluid through the filter, but will prevent egress of impurities from the filter. Thus, the impurities that are present in the fluid stream are collected in the filter as the fluid flows though it.

Because of the force of the fluid flow, the filter must be attached to the inlet pipe or other structural support, as the case may be, to prevent the filter from being carried away by the fluid. Conventionally, filters are attached to pipes using screws or spring type fixtures, e.g. spring clips. The conventional method suffers from a number of drawbacks. In particular, the attachment and removal of screws is time consuming and awkward. The awkwardness of using screws can be heightened by the environment in which the filters are often used. That is, filters must often be placed in cramped and narrow areas of a machine. In such an environment, the maneuvering of a plurality of screws soon becomes tiresome.

Spring fixtures are somewhat easier to attach, but they introduce additional problems. Specifically, spring fixtures tend to be unstable and unsteady, with the result that the filter can be lost to the fluid flow. Depending on the application in which the filter is used, the consequences of losing the filter can range in severity from poor product quality to total shutdown.

OBJECTS AND SUMMARY OF THE INVENTION

Accordingly, it is a general object of the present invention to provide an improved method and device for attaching filters.

It is another object of the present invention to provide a filter fixture which is easily attached and detached.

It is a related object of the present invention to provide a filter fixture which is secure and may be quickly attached and detached.

It is an additional object of the present invention to provide a filter fixture suitable for use with a wide range of structures.

Further objects and advantages will become apparent from the ensuing description.

Accordingly, the present invention provides a device for attaching a filter to fluid flow pipe which includes an upper portion and a lower portion. The upper portion includes projections for securing the fixture to the device. The lower portion is connected to the upper portion and retains the filter in engagement with the entrance to the pipe. The lower portion is inserted into the pipe and frictionally engages the wall of the pipe to retain the device in a fixed position.

BRIEF DESCRIPTION OF THE DRAWINGS

The present invention will now be described by way of example with reference to the accompanying drawings in which:

FIG. 1 is an end elevational view of a filter fixture according to the invention;

FIG. 2 is a front perspective view of a filter fixture according to the invention;

FIG. 3 shows a plate of material from which a filter fixture according to present invention is made, prior to rolling;

FIG. 4 is a side view of the plate of material shown in FIG. 3 illustrating how the filter fixture is bent in an alternating fashion;

DETAILED DESCRIPTION OF A PREFERRED EMBODIMENT

Figure 5:
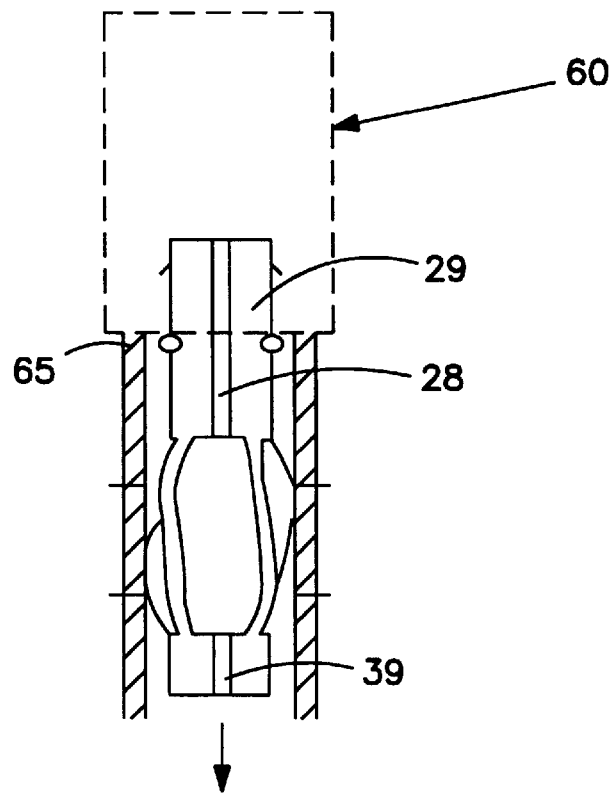
FIG. 5 is a vertical sectional view showing a filter fixture according to present invention used to secure an oil filter to an inlet pipe.

Turning now to the drawings, FIG. 2 shows a front perspective view of a filter fixture according to the invention. As shown in FIG. 2 a filter fixture or filter attaching device 10 according to the invention includes an upper portion, designated generally 20, and a lower portion, designated generally 30. The upper portion 20 is formed to engage a filter and secure it to the device 10. The lower portion 30 is formed to engage the walls of a pipe or conduit and retain the filter in engagement with the entrance to the pipe or conduit.

As illustrated in FIG. 2, the upper or filter engaging portion 20 of the present invention is generally cylindrical. In a preferred embodiment, the upper or filter engaging portion 20 forms a generally cylindrical and hollow enclosure 22, to facilitate the passage of fluid through the upper portion 20. It will be apparent to those skilled in the art, however, that other shapes could be used without departing from the scope of the invention, e.g. rectangular. The upper or filter engaging portion 20 is preferably formed from a resilient or spring material, for example, phosphor copper.

The upper or filter engaging portion 20 has an outer surface 23. A plurality of filter engagement formations 24, 26 are provided on the outside surface 23. These filter engagement formations preferably include a multitude of hooks or projections 24 for catching or snagging a filter and securing it to the device 10. These hooks or projections 24 may be provided in the form of generally triangular teeth as shown in FIG. 3. The filter engagement formations also preferably include a plurality of juts or protrusions 26 for abutting and supporting a filter, when the filter has been attached to the device 10. The juts or protrusions 26 may comprise generally rounded nobs, as best shown in FIG. 4.

As shown in FIGS. 2 and 3, the hooks or projections 24 are arranged in spaced relation around the outer surface 23 of the upper or filter engaging portion 20. The juts or supporting protrusions 26 are arranged in a similar fashion beneath the hooks or projections 24. Specifically, the juts or protrusions 26 are spaced apart from each other and form a row substantially aligned with the hooks or projections 24.

Figure 6:
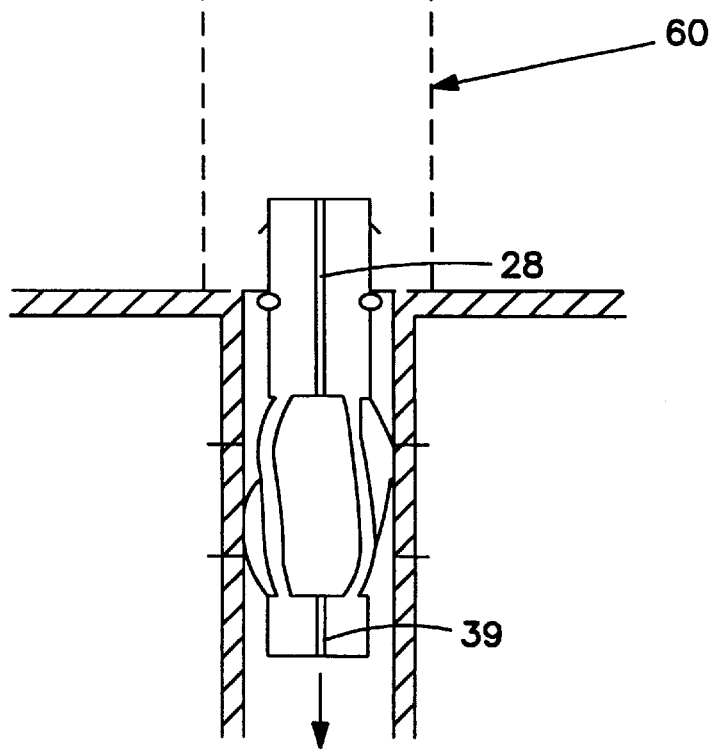
FIG. 6 is a vertical sectional view showing a filter fixture according to present invention used to secure a water filter to an inlet pipe.

In final form, the outer surface 23 of the upper or filter engaging portion 20 also includes a longitudinal space or gap 28, as illustrated in FIGS. 1, 5, 6 and 7. The space or gap 28 is formed along the entire length of the upper or filter engaging portion 20. The space or gap 28 is positioned substantially in the center of a front section 29 of the upper portion 20. The space or gap 28 has a width W. Advantageously, the gap or space 28 facilitates expansion or contraction of the resilient upper portion 20. Expansion or contraction of the present invention advantageously allows it to be used with different sizes of pipes, as will be discussed in detail later. As the upper portion 20 is expanded or contracted, the width W of the space or gap varies in a corresponding manner. FIGS. 5 and 6 illustrate how the gap width W can vary in size.

As stated above, a filter fixture or a filter attaching device 10 according to the invention also includes a lower portion 30. The lower portion 30, which retains a filter in engagement with the entrance to a pipe or conduit, is connected to and integral with the upper portion 20. The lower portion 30 is also formed of spring or resilient material and is preferably formed of the same type of spring or resilient material as the upper portion.

Figure 7:
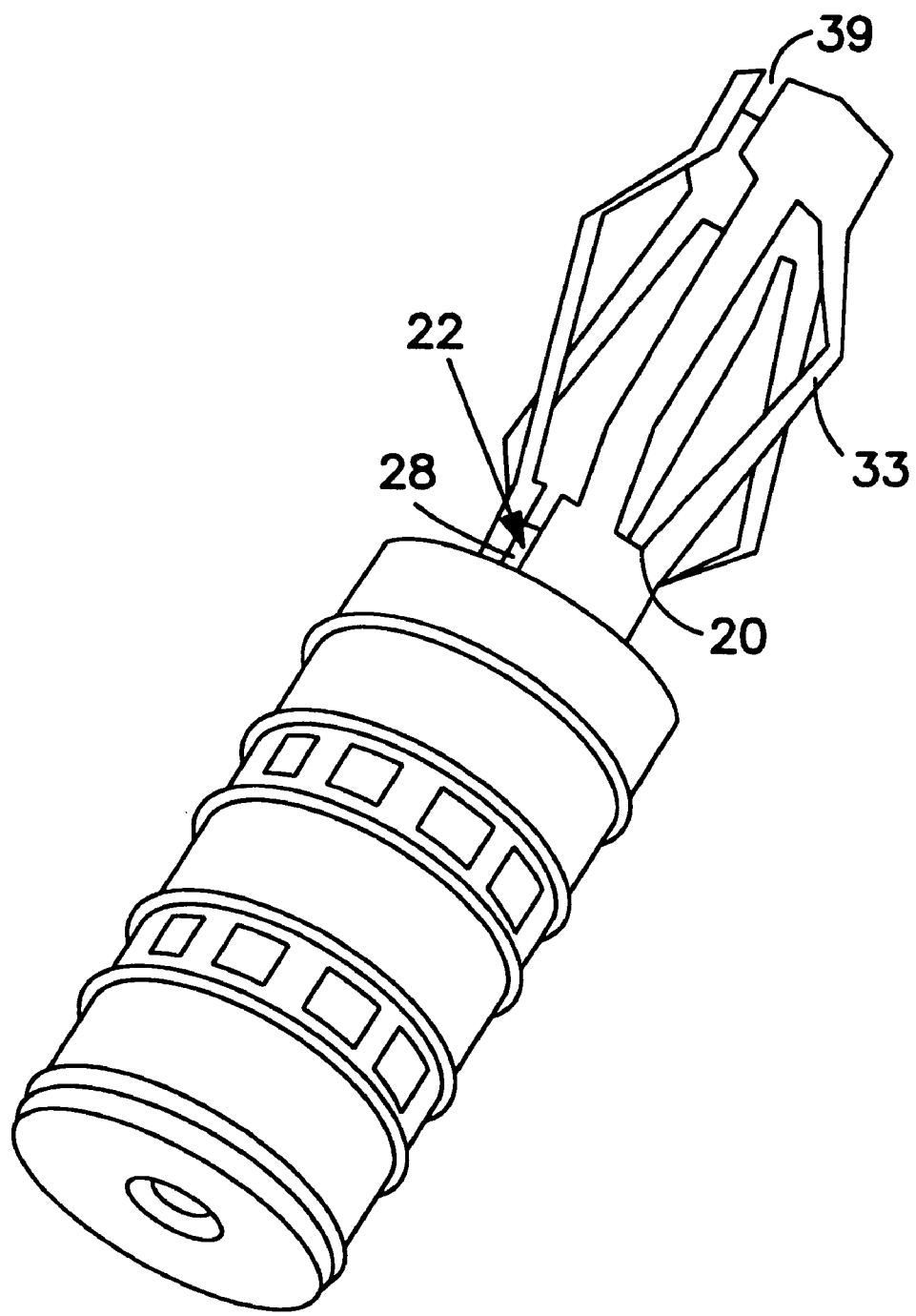
FIG. 7 is a perspective view of a filter fixture according to the invention with a filter attached, prior to insertion in a pipe.

The lower portion 30 comprises a body portion 32 and an end portion 36. The body portion 32 includes a plurality of elongate plate members or strips 33. As best seen in FIG. 7, the elongate plate members or strips 33 are arranged in spaced relation around the bottom of the upper portion 20. The spacing of the plate members or strips 33 defines a cage-like enclosure in the lower portion 30. The spacing of the plate members 33 also facilitates passage of fluid through the lower portion 30, once the device 10 has been installed in a pipe.

The elongate plate members or strips 33 are bent at predetermined locations along their length. Bending of the plate members or strips 33 is carried out so that generally circular bulges 40, 50 are formed in the lower portion 30 of the filter fixture. Specifically, the plate members or strips 33 are bent at generally upper and lower portions along their length so that upper and lower bulges 40, 50 are formed. The upper and lower bending is performed in an alternating fashion so that strips that have been bent at a generally lower location alternate with strips that have been bent at a generally upper location. This is best illustrated in FIGS. 4 and 7. Bending is also carried out so that the circles defined by the upper and lower circular bulges 40, 50 have substantially the same diameter and are concentric with each other.

The upper and lower bulges 40, 50 are provided for retaining the filter attaching device 10 in a fixed position. These upper and lower bulges 40, 50 are adapted to frictionally engage the walls of a pipe so that a filter attached to the upper portion 20 is held in engagement with the entrance to the pipe. Specifically, these upper and lower bulges 40, 50 provide substantially annular upper and lower frictional contact regions.

As illustrated in FIG. 2, a first or upper end 34 of the plate members or strips 33 is connected to the upper portion 20. An opposite or lower end 35 is connected to the end portion 36 of the filter fixture 10. Preferably the end portion 36 is integral with the plate members 33. It is also preferred that the end portion be formed of the same resilient material as the plate members 33 and upper portion 20.

The end portion 36 of the filter fixture, like the upper portion 20, forms a generally cylindrical enclosure 37. The generally cylindrical enclosure 37 has an outer surface 38. A lower gap or space 39 is provided in the cylindrical enclosure 37. The lower gap or space 39 has a width W' which is preferably the same as the width W of the upper gap 28. In the present invention, the width W' of the gap 39 varies in accordance with the width W of the gap 28. Specifically, when the upper portion 20 is contracted to change the width W of the gap 28, the end portion is also contracted to change the width W' of the gap 39 the by the same amount.

The method of making the invention will now be described. Advantageously, the present invention may be manufactured by a relatively simple method so that production costs are minimized and efficiency is a maximized. A filter fixture or filter attaching device 10 according to the invention is manufactured by stamping a piece of material, rolling the stamped plate or piece of material on a die to form a generally cylindrical shape, and then bending the plate members 33 in an alternating fashion. FIG. 3 illustrates the stamped piece of material from which the present invention is made, prior to rolling. FIG. 4 illustrates how the bending is performed in an alternating fashion.

The operation of the present invention will now be described. In this regard, attention is directed to FIGS. 5 and 6. FIGS. 5 and 6 show two possible applications of the present invention. Specifically, FIG. 5 shows the present invention used with a oil filter and positioned in the entrance to an oil tank. FIG. 6 shows the present invention used with a water filter and positioned in an entrance to a water tank. It will be understood by those skilled in the art, however, that the present invention could be used in many other applications and is not limited to the examples shown.

The filter attaching device or fixture 10 of the present invention is adapted to attach a filter 60 to a pipe or conduit entrance 65. The filter fixture 10 of the present invention may be used with pipes or conduits that fall within a predetermined size range. When the pipe or conduit is of a size near the lower end of the range, which is the case in FIG. 6, the upper cylindrical portion 20 is contracted to facilitate insertion of the filter attaching device 10 in the pipe. Preferably, the upper cylindrical portion 20 is contracted to a size substantially equal to that of the pipe. Contraction of the upper portion causes a corresponding amount of contraction in the lower and end portions 30, 36 of the filter fixture 10. It also causes the gaps 28 and 39 to narrow. Contraction can be carried out manually or with any suitable device, e.g. a clamp.

Once the filter fixture 10 has been contracted to the desired size, the filter 60 is attached to the upper cylindrical portion 20. Specifically, the filter 60 is lowered onto the device 10 until it abuts the protrusions or juts 20. The juts or protrusions 20 prevent the filter 60 from moving further down the filter fixture 10 and also serve as guides for assuring the correct placement of the filter 60 on the device 10. As the filter 60 is lowered onto the filter fixture 10, the hooks or projections 24 catch or snag the filter 60. In this manner, the filter 60 is secured to the upper portion 20 of the filter fixture 10.

After the filter 60 has been positioned and secured, the device 10 is lowered into the pipe until the filter 60 engages the entrance 65 of the pipe. As illustrated in FIG. 6, the device 10 is formed so that when the filter 60 engages the pipe entrance 65, all of the lower portion 30 is positioned inside the pipe. Additionally, approximately half of the upper portion 20 is positioned in the pipe and the protrusions or juts 26 on the upper portion are substantially level with the entrance to the pipe.

Once the filter 60 has been brought into engagement with the pipe entrance 65, the resiliency of the filter fixture 10 will cause it to expand within the pipe. Expansion will continue until the upper and lower bulges 40, 50 frictionally engage the walls of the pipe. This frictional engagement stabilizes the fixture and maintains the filter in engagement with the pipe entrance 65. Trial runs of the present invention have shown that the filter fixture provides stability in fluid pressures ranging from 2–3 kg/cm$^3$. Of course, the pressures the filter fixture 10 can withstand will depend on the material from which it is constructed and the particular application in which it is used.

A slightly different procedure is used to install the filter fixture 10 when the pipe size falls near the upper end of the predetermined size range. Rather than contacting the fixture 10, the fixture 10 is expanded before it is inserted into the pipe. Preferably, the fixture 10 is expanded to a size that is substantially the same as that of the pipe. The fixture 10 is expanded to a dimension suitable for frictional engagement of the bulges 40, 50 with the walls of the pipe.

Thus, an improved method and device for attaching a filter has been described. The filter fixture of the present invention is simple in construction, may be easily manufactured, and is easy to use. Only one fixture is needed to attach a filter to a pipe. Moreover, the fixture of the present invention securely retains a filter in engagement with the pipe entrance.

What is claimed is:

1. A device for attaching a filter to a fluid flow pipe having an entrance and interior walls, said device comprising:

an upper portion for engaging the filter, the upper portion being formed to permit passage of the fluid through the filter and into the pipe, the upper portion having an outer surface on which a plurality of projections are formed, the projections being adapted to secure the filter to the device; and a lower portion connected to the upper portion for retaining the filter in engagement with the entrance to the pipe, the lower portion being adapted for insertion into the pipe so that it is positioned in the fluid flow path, the lower portion being formed to permit passage of fluid therethrough, the lower portion being formed from resilient material and having a plurality of elongate plate members arranged in spaced relation around a bottom of the upper portion, the elongate plate members being bent so that a generally circular bulge is formed creating a generally annular frictional contact region to retain the device in a fixed position.

2. A device according to claim 1 in which the outer surface of the upper portion is formed from resilient material.

3. A device according to claim 2 in which the outer surface of the upper portion comprises a generally cylindrical hollow enclosure.

4. A device according to claim 3 in which a gap is formed along the length of the generally cylindrical hollow enclosure to facilitate expansion or contraction of the upper portion.

5. A device according to claim 1 in which the projections comprise hooks for catching the filter and securing it to the device.

6. A device according to claim 3 in which the projections are arranged in spaced, apart relation on the generally cylindrical hollow enclosure, and are arranged to circumscribe the hollow enclosure.

7. A device according to claim 1 in which the upper portion further comprises a plurality of protrusions formed on its outer surface for supporting the filter once it has been secured to the device.

8. A device according to claim 7 in which the protrusions comprise generally rounded nobs and act as guide means for correctly positioning the filter on the device.

9. A device according to claim 7 in which the projections are formed on a generally upper part of the upper region and the protrusions are formed on a generally lower part of the upper portion.

10. A device according to claim 9 in which the projections are arranged in a first row on the outer surface and the protrusions are arranged in a second row on the outer surface, the second row being formed beneath the first row and being generally aligned with the first row.

11. A device according to claim 1 in which the lower portion further comprises a generally cylindrical hollow end portion, and in which the elongate plate members each have an upper end attached to the bottom of the upper portion and a generally opposite lower end attached to the generally cylindrical hollow end portion.

12. A device according to claim 11 in which the generally cylindrical hollow end portion has a gap formed along its length for facilitating the contraction or expansion of the lower portion.

13. A device according to claim 1 in which the elongate plate members are bent at generally upper and lower regions along their length, the bending being carried out in an alternating fashion, so that plate members that have been bent at a generally lower region alternate with plate members that have been bent at a generally upper region.

14. A device according to claim 1 in which the generally circular upper and lower bulges are concentric with each other and have the same diameter.

15. A device according to claim 1 in which the upper and lower portions are formed from phosphor copper.

16. A device for attaching a filter to a fluid flow pipe having an entrance and interior walls, said device comprising:

an upper portion for engaging the filter, the upper portion being formed to permit passage of the fluid through the filter and into the pipe, the upper portion having an outer surface on which a plurality of projections are formed, the projections being adapted to secure the filter to the device, the outer surface further being formed from resilient material and comprising a generally cylindrical hollow enclosure, the generally cylindrical hollow enclosure having a gap along its length to facilitate expansion or contraction of the upper portion; and a lower portion connected to the upper portion for retaining the filter in engagement with the entrance to the pipe, the lower portion being adapted for insertion into the pipe so that it is positioned in the fluid flow path, the lower portion being formed to permit passage of fluid therethrough and including means for frictionally engaging the walls of the pipe to retain the device in a fixed position.

17. A device for attaching a filter to a fluid flow pipe having an entrance and interior walls, said device comprising:

an upper portion for engaging the filter, the upper portion being formed to permit passage of the fluid through the filter and into the pipe, the upper portion having an outer surface on which a plurality of projections are formed, the projections being adapted to secure the filter to the device; and a lower portion connected to the upper portion for retaining the filter in engagement with the entrance to the pipe, the lower portion being formed from resilient material and being adapted for insertion into the pipe so that it is positioned in the fluid flow path, the lower portion also being formed to permit passage of fluid therethrough, and including means for frictionally engaging the walls of the pipe to retain the device in a fixed position, the lower portion further comprising a plurality of elongate plate members arranged in spaced relation around a bottom of the upper portion and a generally cylindrical hollow end portion, the elongate plate members each having an upper end attached to the bottom of the upper portion and a generally opposite lower end attached to the generally cylindrical hollow end portion, the generally cylindrical hollow end portion further having a gap along its length for facilitating the contraction or expansion of the lower portion.

* * * * *